No. 862,544. PATENTED AUG. 6, 1907.
R. E. CRANE & O. J. BACKUS.
WATER CLOSET APPARATUS.
APPLICATION FILED MAY 4, 1906.
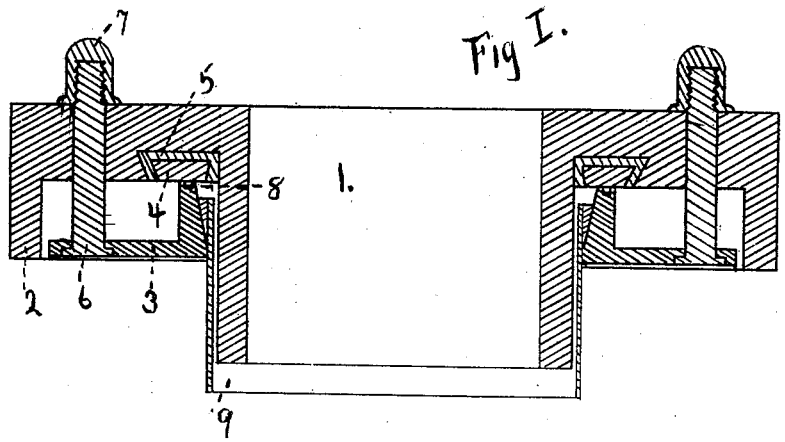
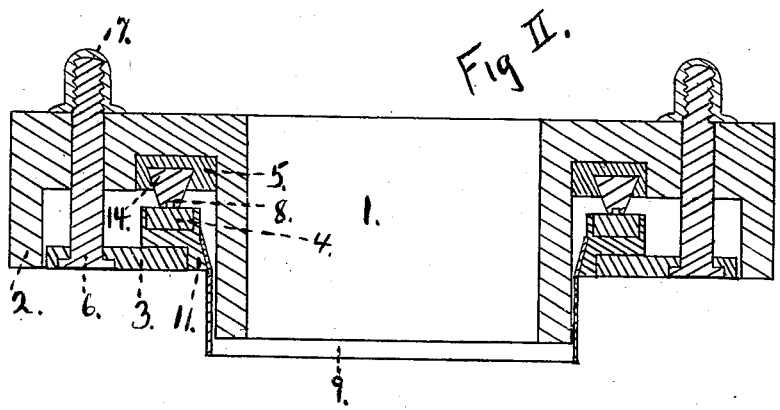
WITNESSES:
INVENTORS

UNITED STATES PATENT OFFICE.

RAYMOND E. CRANE AND OSCAR J. BACKUS, OF NEWARK, NEW JERSEY.

WATER-CLOSET APPARATUS.

No. 862,544.

Specification of Letters Patent.

Patented Aug. 6, 1907.

Application filed May 4, 1906. Serial No. 315,128.

*To all whom it may concern:*

Be it known that RAYMOND E. CRANE and OSCAR J. BACKUS, citizens of the United States, residing at Newark, in the county of Essex and State of New Jersey, have invented certain new and useful Improvements in Water-Closet Apparatus, of which the following is a specification.

Our invention relates to connections between the soil pipe and the outlet portion of a water closet, urinal, or the like and the objects of our improvement are to provide a connection for this purpose which will be so perfect that no leakage of sewer gas can flow into a room where the fixture is installed.

We attain our object in the manner shown in the accompanying drawing in which—

Figure 1 is a sectional vertical view of the device as we prefer to make it, and Fig. 2 is a vertical section of our invention with a slight modification.

Similar numbers refer to similar parts throughout the two views.

The closet bowl 2 with its discharge pipe 1 is provided with a depression on its foot which contains a small amount of cement or other plastic material which when it hardens connects one member of the joint to the closet bowl. The floor flange 3 is bolted to the closet bowl by means of bolt 6. When nut 7 is tightened the flange is drawn toward the base of the bowl pressing the grooved seat 8 into the gasket 4. This gasket 4 is preferably made with asbestos or some other fibrous material, as an ingredient thereof.

Referring to Fig. 1, the flange 3 is provided with a raised seat which comes in contact with the gasket 4. As the cement 5 makes a perfect joint between the gasket 4 and the bowl 2, the only joint remaining (to be made) is between the gasket 4 and the seat 8.

Referring to Fig. 2, the ring 14 is joined to the bowl by means of the cement 5. Seat 8 is made in the ring 14. The ring 11 is made separate from the flange 3 and is provided with a recess which contains the gasket 4. In both figures the outlet or soil pipe 9 is soldered to the device, in Fig. 1, it being soldered to the upright part of the flange 3, and in Fig. 2, it is soldered to the ring 11.

It will be noticed that the cement 5 forms a back for the gasket in Fig. 1, and takes up any unevenness in the earthenware. The shrinkage in earthenware due to firing is very uncertain and in a device of this kind, unless the gasket is very thick and soft, the unevenness of the bowl prevents a perfect joint being formed. Where a fibrous material such as we use is used, the bolts must be screwed up so tight that there is a strain on the earthenware, unless a backing of cement or its equivalent is used. As shown in Fig. 2, a holder for the gasket is provided in the ring 11 which can be turned up true on a lathe. The ring 14 is fastened in the bowl by a special device which insures its being level with the floor. In this way, in either construction, the gasket is made perfectly tight by a very slight pressure on the nuts 7.

The ring 11 is made separate from the part of the ring that is bolted to the bowl. This will allow the closet bowl to be turned around without removing the bolts from the flange, as the outside ring only will turn with the closet.

We are aware that there are a number of features of this article that are not new, but What we do claim as new and desire to secure by Letters Patent is the following:—

In combination with a floor plate for connecting a water closet or other sanitary fixture to the soil pipe, a soil pipe connected to said plate, a seating surface and seat joining said sanitary fixture to said plate, and a revoluble ring bolted to said sanitary fixture which clamps said floor plate to said sanitary fixture making the joint between said seating surface and seat, said sanitary fixture and loose ring being revoluble as a unit, without disturbing the joint between said seating surface and seat, substantially as described.

In testimony whereof we affix our signatures in presence of two witnesses.

RAYMOND E. CRANE.
OSCAR J. BACKUS.

Witnesses:
JOHN C. STUBER,
HORACE G. OWEN.